(12) United States Patent
Gaertner et al.

(10) Patent No.: US 7,040,837 B2
(45) Date of Patent: May 9, 2006

(54) SELF-PROPELLED ROAD MILLING MACHINE WITH COOLING SYSTEM

(75) Inventors: Olaf Gaertner, Linz/Rhein (DE); Thorsten Langen, Bonn (DE); Dieter Bungarten, Neustadt/Wied (DE)

(73) Assignee: WIRTGEN GmbH, Windhaven (DE)

( * ) Notice: Subject to any disclaimer, the term of this patent is extended or adjusted under 35 U.S.C. 154(b) by 0 days.

(21) Appl. No.: 10/961,909

(22) Filed: Oct. 8, 2004

(65) Prior Publication Data

US 2005/0117970 A1    Jun. 2, 2005

(30) Foreign Application Priority Data

Oct. 10, 2003   (DE) ............................... 103 47 872

(51) Int. Cl.
*E01C 23/06*    (2006.01)

(52) U.S. Cl. ...................... 404/93; 454/237; 123/41.49

(58) Field of Classification Search ............ 404/84.05, 404/72, 75, 90, 92, 93; 454/143, 162, 237, 454/241, 251; 123/41.49, 41.01, 41.46, 41.48
See application file for complete search history.

(56) References Cited

U.S. PATENT DOCUMENTS

| | | | | |
|---|---|---|---|---|
| 3,866,580 A | * | 2/1975 | Whitehurst et al. | 123/41.7 |
| 4,120,271 A | * | 10/1978 | Edmaier | 123/41.49 |
| 4,241,702 A | * | 12/1980 | Takeuchi et al. | 123/41.7 |
| 4,382,481 A | * | 5/1983 | Moore | 180/68.1 |
| 4,454,926 A | * | 6/1984 | Akins | 180/68.1 |
| 4,793,732 A | * | 12/1988 | Jordon | 404/90 |
| 4,934,449 A | * | 6/1990 | Watt et al. | 165/41 |
| 5,168,722 A | * | 12/1992 | Brock | 62/304 |
| 5,207,187 A | * | 5/1993 | Kurohara et al. | 123/41.7 |
| 5,216,983 A | * | 6/1993 | Nilson | 123/41.12 |
| 5,265,995 A | * | 11/1993 | Beck | 414/694 |
| 5,470,176 A | * | 11/1995 | Corcoran et al. | 404/72 |
| 5,839,397 A | * | 11/1998 | Funabashi et al. | 123/41.01 |
| 5,893,677 A | | 4/1999 | Haehn et al. | 404/90 |
| H1841 H | * | 3/2000 | Simmons | 60/597 |
| 6,129,056 A | * | 10/2000 | Skeel et al. | 123/41.49 |
| 6,192,839 B1 | * | 2/2001 | Takeshita et al. | 123/41.49 |
| 6,393,959 B1 | * | 5/2002 | Amemiya | 89/1.13 |
| 6,659,685 B1 | * | 12/2003 | Persson | 404/133.1 |
| 6,733,086 B1 | * | 5/2004 | McSharry et al. | 299/64 |
| 6,922,925 B1 | * | 8/2005 | Watanabe et al. | 37/466 |

FOREIGN PATENT DOCUMENTS

EP            304080 A2  *  2/1989

* cited by examiner

*Primary Examiner*—Thomas B. Will
*Assistant Examiner*—Alexandra Pechhold
(74) *Attorney, Agent, or Firm*—Heslin Rothenberg Farley & Mesiti P.C.

(57) ABSTRACT

A self-propelled road milling machine is equipped with a cooling system comprising a fan for drawing in air, a cooler, and a suction channel. The suction channel has a vent opening facing the cooler and an intake opening. In relation to the longitudinal axis of the road milling machine, the intake opening points to the side of the road milling machine, so that air is drawn in from the side. This results in significantly less dirt being sucked into the machine than when the suction channel is positioned in the direction of travel. In a preferred embodiment, the suction channel is formed in one piece with a liquid tank of the road milling machine. The liquid tank and suction system therefore form a modular unit, which can be easily installed on the chassis of the road milling machine.

18 Claims, 4 Drawing Sheets

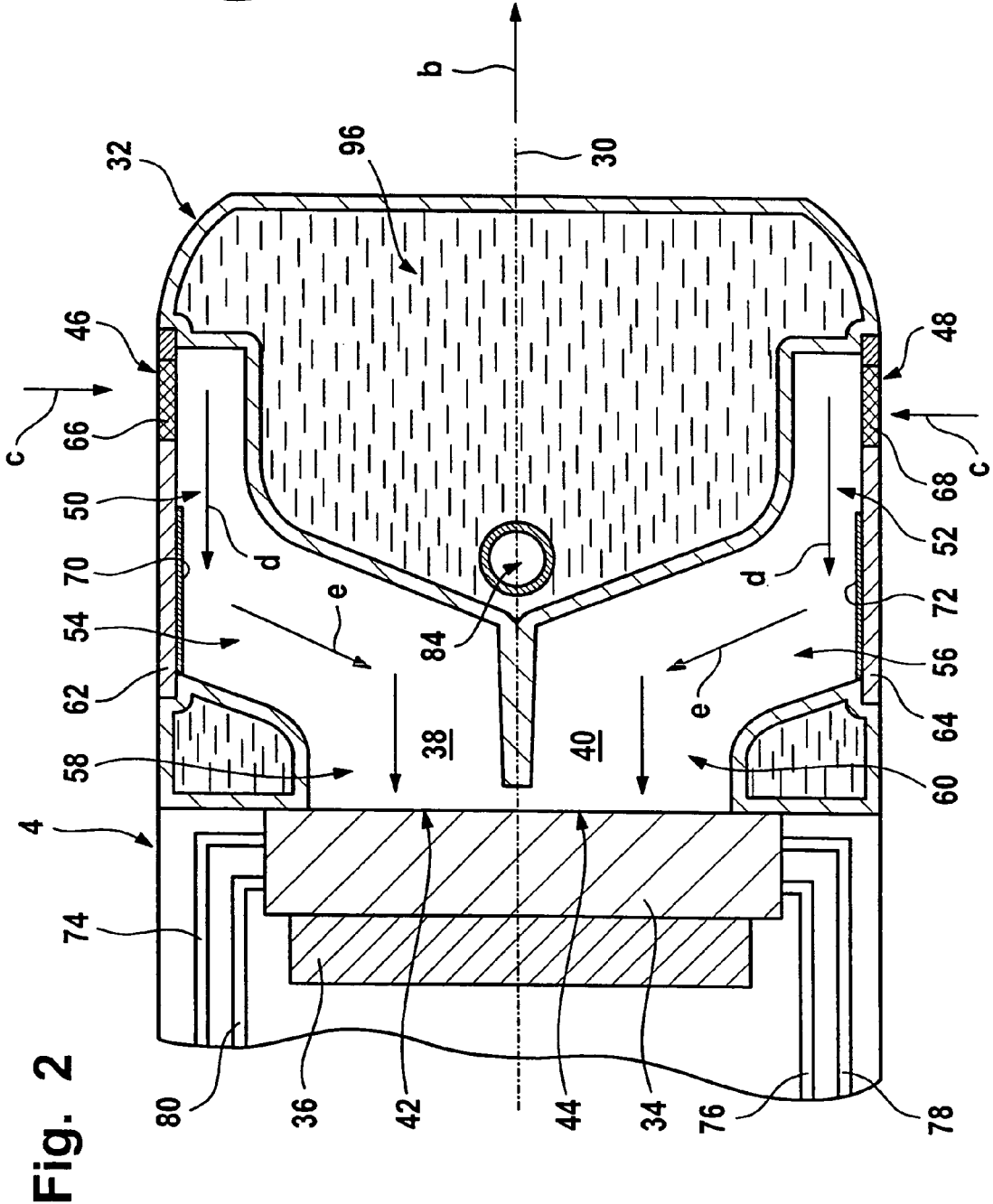
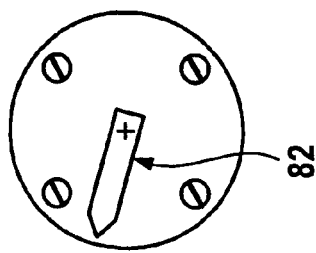

SELF-PROPELLED ROAD MILLING MACHINE WITH COOLING SYSTEM

FIELD OF THE INVENTION

The present invention relates to a self-propelled road milling machine with a cooling system, where the cooling system comprises at least one fan for drawing in air, at least one cooler, and at least one suction channel that has a vent opening and an intake opening facing the cooler.

BACKGROUND ART

Current self-propelled road milling machines generally have a drive motor for propelling the road milling machine and for moving the tools.

For cooling the drive motor and the hydraulic liquid, current road milling machines have a cooling system, which usually consists of a fan for drawing in ambient air, a cooler, and a suction channel. The suction channel, which is usually formed by parts of the chassis, has an intake opening that is directed either to the rear—that is, in the direction counter to the machine's direction of travel—or to the front—that is, in the machine's direction of travel. Accordingly, the ambient air is drawn in either from the rear or the front. The suction channel runs from the intake opening along the longitudinal axis of the road milling machine to a vent opening located directly in front of the cooler. In order to prevent debris, e.g., small particles of milled material or construction waste, from getting into the cooler, a gratelike cooler grill is located in front of the suction channel's intake opening.

The cooler itself has several ducts around which ambient air may circulate. They are located in front of the vent opening, and a coolant for the drive motor is flowing through them. A fan is provided either in front of or behind the cooler, as seen from the direction the air is flowing, in order to draw in the ambient air. In this context the so-called combination coolers should be mentioned in which several separate cooling circuits are provided, e.g., a cooling circuit for the drive motor coolant—as described above—a cooling circuit for hydraulic fluid, and, if necessary, an additional cooling circuit, e.g., for charge air. All of these are configured on the same principle.

Current road milling machines, which have suction channels directed either to the front or the rear, have the disadvantage that despite the cooler grill a great amount of dust and dirt can enter the suction channel and eventually reach the cooler and the fan. Furthermore, it is also disadvantageous that the cooling system described generates a great amount of noise.

SUMMARY OF THE INVENTION

The purpose of the present invention is to produce a self-propelled road milling machine, in which the cooling system and the components surrounding it are less prone to becoming dirty and generate less noise.

The cooling system of the self-propelled road milling machine according to the invention has at least one fan for drawing in cooling air from the ambient air. A self-propelled road milling machine in this context refers to a machine that is equipped with its own drive motor for propulsion. The fan can be any device that allows the drawing-in of air; normally, rotating fan blades are used. Further, the cooling system includes at least one cooler. The cooler can, for example, be structured as initially described according to the current state of the art. Furthermore, the cooling system is comprised of at least one suction channel with a vent opening facing the cooler and an intake opening. According to the invention, in relation to the machine's longitudinal axis, the intake opening is pointed to the side of the milling machine, so that the cooling air can be drawn in from the side. The longitudinal axis refers to the axis of the road milling machine that extends along the length of the machine from the rear to the front.

The suction channel and the components attached to the suction channel are significantly less subject to accumulating dirt when the air is drawn in from the side, in particular, because a great amount of dust is stirred up in front of or behind the road milling machine. Furthermore, it has been demonstrated that the noise generated by the cooling system can be reduced by placing the intake opening on the side of the machine. This is due to the fact that the suction channel with the lateral air supply can be longer than when the air flows into it directly from the front.

In one preferred embodiment of the road milling machine according to the invention, the suction channel has at least three sections. One channel section is connected to the intake opening and is positioned in such a way that the air basically flows parallel to the longitudinal axis of the road milling machine. A second channel section connected to the first one is designed in such a way that the air basically flows diagonally to the longitudinal axis. The third channel section is connected to the second one and is designed in such a way that the air basically flows parallel to the longitudinal axis all the way to the vent opening. Preferably, the channel sections and the junctions between them are designed in such a way that as little turbulence as possible is generated. The special, relatively long design of the suction channel with the separate channel sections results in less noise generation.

Since the cooling system is positioned on the front end of many road milling machines, in a preferred embodiment of the invention the channel sections are positioned in such a way that the air in the first channel section basically flows in the direction counter to the machine's direction of travel. In the second channel section, the air essentially flows across the machine's direction of travel, and in the third channel section it essentially flows in the direction counter to the machine's direction of travel all the way to the vent opening.

An especially preferred embodiment of the road milling machine, according to the invention, is designed to achieve a particularly effective air supply to the cooling system by providing two suction channels. Here, the intake opening of the first suction channel is on one side, and the intake opening of the second suction channel on the opposite side of the road milling machine. In order to achieve an equal suction of air through both suction channels, the fan can be comprised either of two ventilators or one large fan of sufficient capacity for supplying both suction channels equally. The suction channels can be run separately or lead to a common vent channel.

In many cases, road milling machines are equipped with a tank for a fluid; this tank is usually filled with water. In an especially preferred embodiment, the suction channel is constructed inside the tank. The liquid-filled tank has a sound-deadening or sound-absorbing effect on the suction channel so that the noise generated by the cooling system is further reduced.

In another especially preferred embodiment, the suction channel is built of one piece with the tank. Thus, the liquid tank and suction system form a modular unit that can easily be installed on the chassis of the road milling machine.

The tank is preferably made of plastic so that it and (when applicable) the suction channel are as weatherproof as possible. Furthermore, plastic has high impact resistance; this is very important considering the working environment of road milling machines because it prevents damage from milled material thrown up by the machine.

In another preferred embodiment, the suction channel is concealed by a removable plate on the side in relation to longitudinal axis of the road milling machine.

In another preferred embodiment, the intake opening is located in this plate. Thus, the intake opening can consist, for example, of several holes placed next to each other inside the plate so that a cooler grill or similar device is not necessary.

In another advantageous embodiment, the plate is equipped with a sound-absorbing mat, which further reduces the noise generated by the cooling system. This can be positioned, for example, on the inside of the plate facing the suction channel and can extend over the area of the plate that surrounds the intake opening.

In another preferred embodiment, the cooler and the fan are attached to the liquid tank. This enables a simple, modular connection of the complete cooling system, including the tank, to the other components of the road milling machine.

In order to cool the hydraulic fluid as well as the coolant for the road milling machine's drive motor, the cooler is designed in a preferred embodiment as a so-called combination cooler. That is, the cooler has, for example, one cooling circuit for the drive motor coolant, one cooling circuit for the hydraulic fluid, and, if necessary, another cooling circuit for charge air.

The road milling machine can be designed as a rear-loading road milling machine, where the milled material is discharged from the rear of the milling machine and perhaps transferred to an accompanying vehicle. For this type of machine, the liquid tank, together with the cooling system, can be placed especially advantageously on the front of the machine. Of course, road milling machines can also be front loaders.

In many cases, the liquid tank on a road milling machines is located on the front end of the vehicle with the front wheels or front wheel located underneath the tank. Therefore, it is not possible for the operator in the driver's cab to see the position and orientation of the front wheel. Especially during the machine's approach to the site, this can pose risks to other personnel around the machine and also to the machine itself. In a preferred embodiment, the liquid tank is located above a steerable wheel or the steerable wheel axle. A channel extends through the liquid container and carries a means of transmission that transmits the orientation of the wheel or the wheel axle to a direction indicator on the top of the liquid tank. The means of transmission can be a transmission shaft, for example, and the direction indicator can be a rotatable needle.

BRIEF DESCRIPTION OF THE DRAWINGS

In what follows, the invention is explained in detail using examples of embodiments and referring to the enclosed figures, as follows:

FIG. 2: A section along line A—A of FIG. 1.

FIG. 3: A top view in the direction of the arrow B of FIG. 1.

DETAILED DESCRIPTION OF PREFERRED EMBODIMENTS

Figure 1:
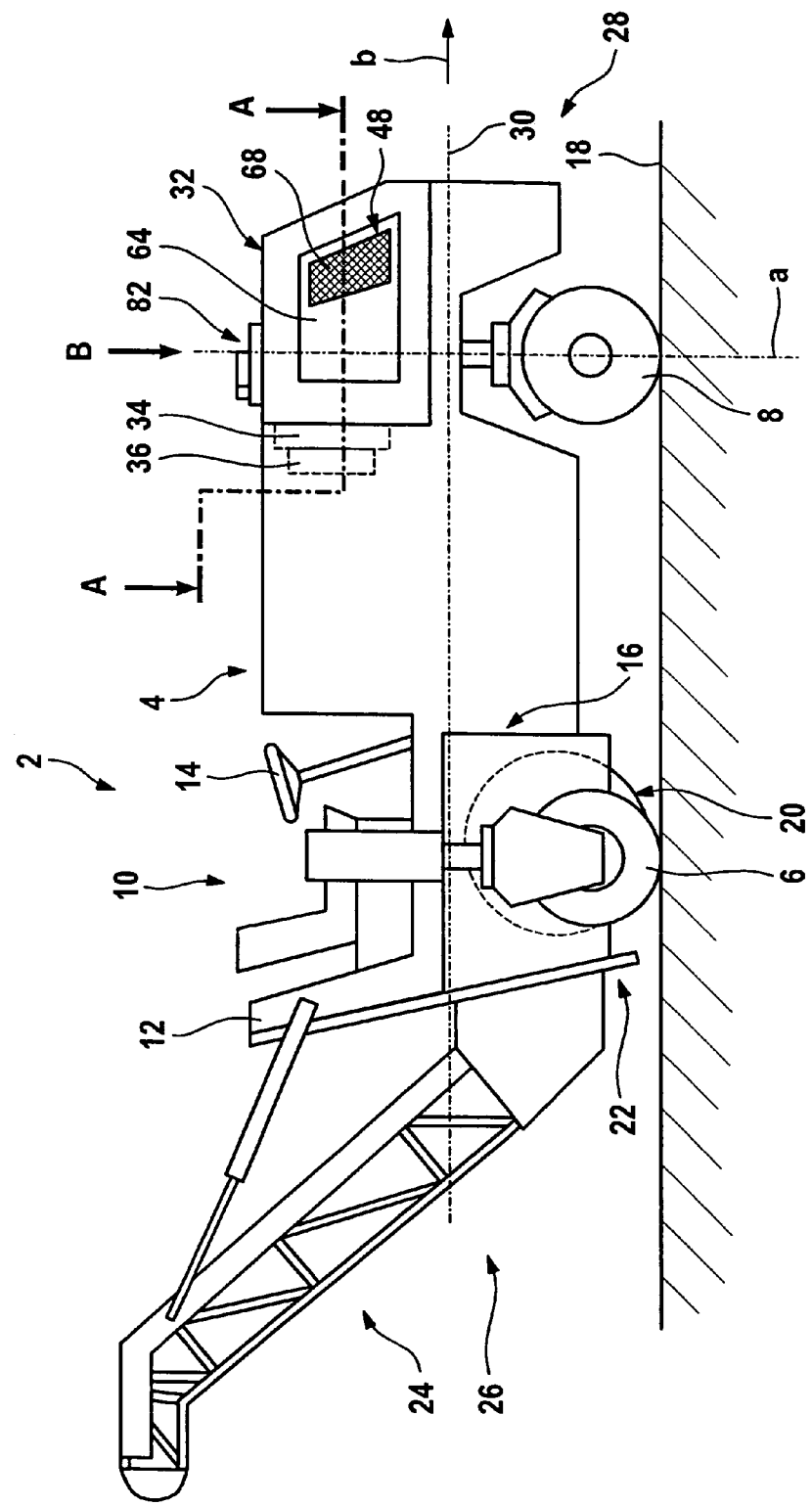
FIG. 1: A schematic illustration of one embodiment of the road milling machine according to the invention in form of a rear-loading road milling machine; lateral view.
Figure 5:
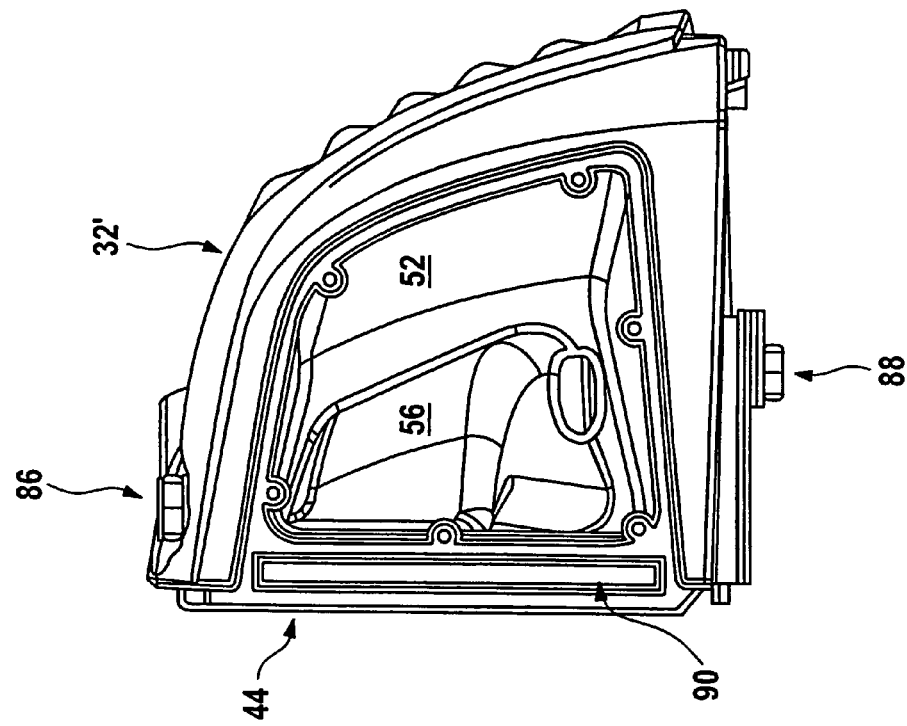
FIG. 5: A lateral view of the liquid tank in FIG. 4 in the direction of the arrow C, with the plate removed.
Figure 4:
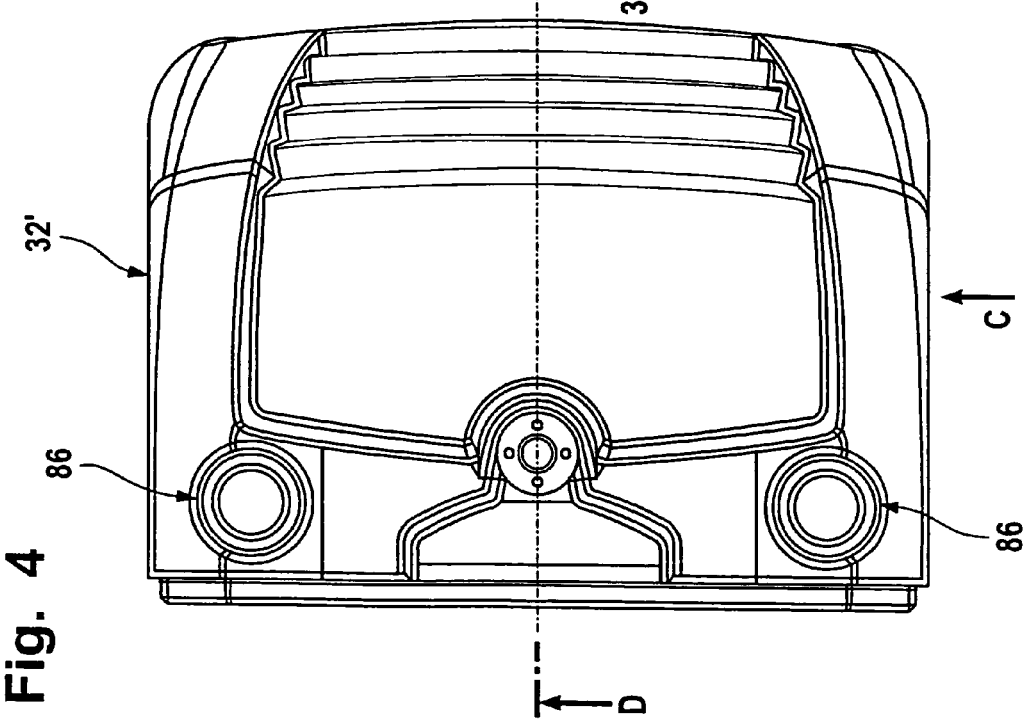
FIG. 4: A top view of a liquid tank according to another embodiment of the present invention.

FIG. 1 shows a rear-loading road milling machine (2). The road milling machine (2) has a chassis (4), which is supported in the present embodiment by three wheels (6, 6, 8), where both the rear wheels (6, 6) (only one of them can be seen in FIG. 1) are located on the sides at the rear. The front wheel (8) is located in the center of the front end of the road milling machine (2). The height of the rear wheels (6, 6) can be adjusted using hydraulics, and the road milling machine (2) is steered via the front wheel (8), which can be rotated around a vertical axis (a). Alternatively, this kind of road milling machine (2) can also be supported on tracks instead of the wheels (6, 6, 8). The number of wheels or tracks can vary.

In addition, at least one drive motor for a rotary cutter and the wheels (6, 6, 8) and a hydraulic system are provided inside the chassis (4). Furthermore, the additional state-of-the-art drive systems are provided, but they are not shown in the drawings for reasons of clarity.

The driver's cab (10) is provided on the top at the rear of the road milling machine (2), where, among other things, there is a seat (12) for the operator and steering gear (14) for steering the front wheel (8).

The cutter housing (16) is positioned below the driver's cab (10). The cutter housing (16) is open at the bottom toward the tarmac (18). This housing contains a rotary cutter (20) whose longitudinal axis extends at right angles to the direction of travel, which is indicated in FIG. 1 by the arrow (b). The rotary cutter (20) protrudes downward beyond the cutter housing (16) toward the tarmac (18).

A height-adjustable scraper unit (22) is provided at the rear end of the cutter housing (16), as seen from the direction of travel (b). Another transport unit (24) is provided behind the scraper unit (22), as seen from the direction of travel (b). This transport unit may be used to transfer the milled material to an accompanying truck with an appropriate loading area (not shown). Since the milled material is transferred to the truck from the rear end of the road milling machine, the machine is a rear-loading road milling machine, as mentioned above.

The road milling machine (2) has a rear (26) and a front end (28), where the front end (28) points forward in the direction of travel (b) and the rear (26) points in the opposite direction. In what follows, the longitudinal axis (30) referred to is that axis of the road milling machine (2) that extends in longitudinal direction of the road milling machine (2) from the rear (26) to the front end (28).

A liquid tank (32) is positioned on the front end (28) above the front wheel (8); this tank is usually filled with water. There is a cooler (34) positioned behind the liquid tank (32), as seen from the direction of travel, and it is attached to this tank (32). Attached to the cooler (34), there is a fan (36), which is used to draw in air.

With reference to FIG. 2, the cooling system of the road milling machine (2) according to the invention is described as follows: In addition to the above-described cooler (34) and fan (36), the cooling system consists of two suction channels (38 and 40). The suction channels (38, 40) each have a vent opening (42 or 44) facing the cooler (34) and an intake opening (46, 48). The intake opening (46) of the suction channel (38) points to one side in relation to the longitudinal axis (30) of the road milling machine (2); as seen from machine's direction of travel (b), it points to the left. The intake opening (48) of the suction channel (40) points to the other side in relation to the longitudinal axis (30) of the road milling machine (2); as seen from the machine's direction of travel (b), it points to the right. When the fan (36) is operating, it is therefore possible for both suction channels (38, 40) to draw in the cooling air from the side as indicated by the arrows (c, c).

The suction channels (38 or 40, respectively) have a first channel section (50 or 52) that is positioned in the direction of flow behind the intake openings (46 or 48, respectively). The first channel section (50 or 52) is designed in such a way that the air drawn in basically flows parallel to the longitudinal axis (30) and counter to the direction of travel as indicated by the arrows (d, d).

A second channel section (54 or 56) pointing to the inside is connected to the first channel section (50 or 52, respectively) so that the air basically flows at right angles to the longitudinal axis (30), as indicated by the arrows (e, e). In the embodiment shown, both air streams are conducted through the second channel section (54 or 56) toward the center of the vehicle, so that the two streams approach each other before they are conducted to the cooler (34), as described in what follows.

Finally, the suction channels (38; 40) each have a third channel section (58 or 60 respectively) through which the air again flows parallel to the longitudinal axis (30) and counter to the direction of travel (b) toward the corresponding vent opening (42; 44), where the air reaches the cooler (34). In contrast to the embodiment illustrated, it is also possible to combine the two sections (58; 60) into one.

As shown in FIG. 2, the suction channels (38; 40) are positioned inside the liquid tank (32) so that they are, for the most part, surrounded by the fluid (96) contained in the tank (32). Furthermore, the suction channels (38; 40) are constructed as one piece together with the plastic liquid tank (32). The suction channels are positioned in the liquid tank in such a way that the air flows for the most part without turbulence. This is achieved by using curved walls largely without edges and corners.

Figure 6:
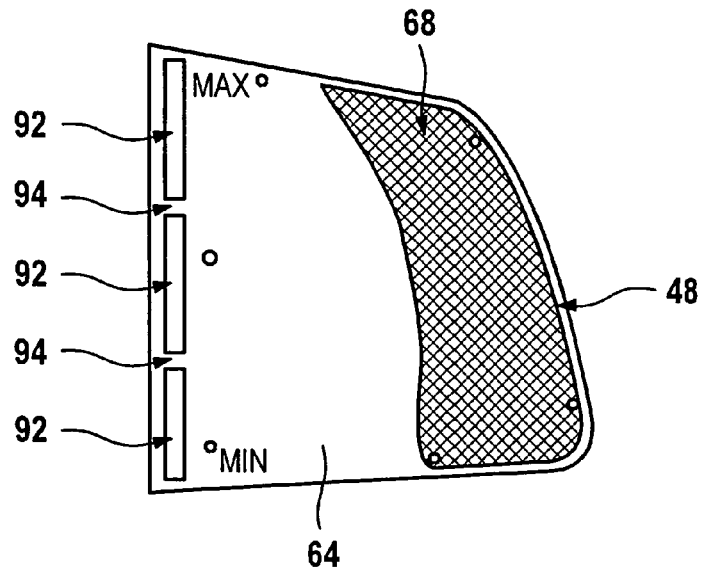
FIG. 6: A lateral view of the plate not shown in FIG. 5.
Figure 7:
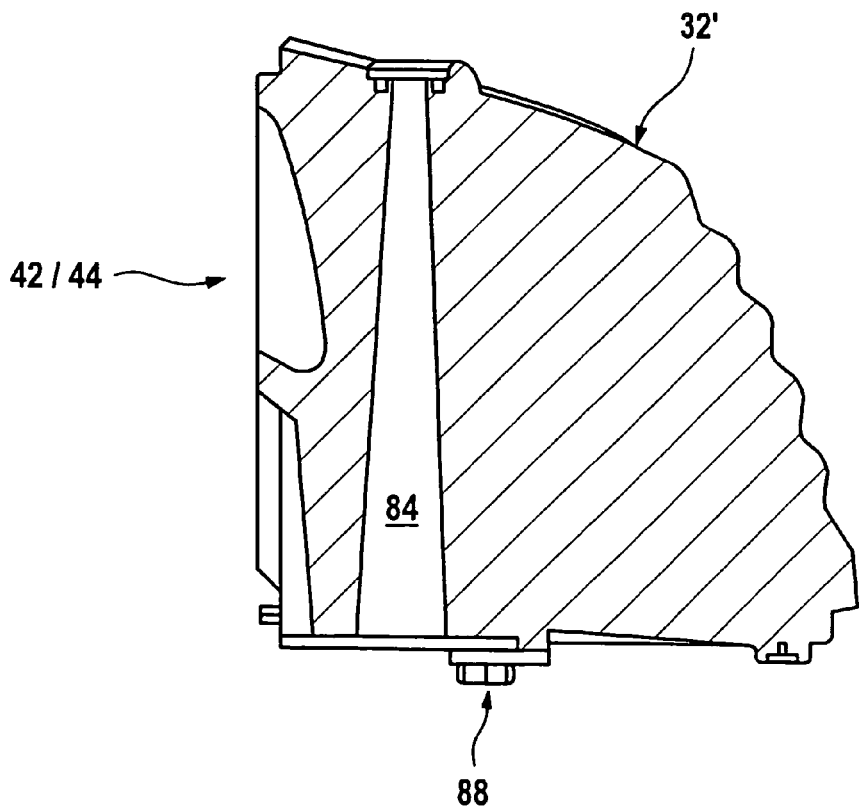
FIG. 7: A section along the line D—D of FIG. 4.

The channel sections (50; 52) of the suction channels (38; 40) are covered on the side by a removable plate (62 or 64). On the front end, as seen in the direction of travel (b), of the plate (62 or 64), there is an opening that corresponds to the intake opening (46; 48) described above. A latticelike structure (66 or 68) (see also FIG. 1 and FIG. 6) is provided inside the intake openings (46; 48) to prevent large particles of debris from getting into the machine.

The plates (62; 64) are both equipped with a sound-absorbing mat (70; 72) facing the suction channel (38; 40) to dampen noise generated by the cooling system. The dimensions of the sound-absorbing mats (70; 72) are designed in such a way that in the lateral view the mats cover the second channel section (54; 56).

The cooler (34) is designed as a so-called combination cooler. That is, it consists of one cooling circuit for the drive motor coolant and a second cooling circuit for the hydraulic fluid of the hydraulic system. The coolant for the drive motor is conducted to the cooler via the conduit (74), and after cooling it is returned to the drive motor via another conduit (76). In addition, the hydraulic fluid for the hydraulic system is conducted to the cooler (34) via a conduit (78), and after cooling it is returned to the hydraulic system via another conduit (80). The cooler (34) itself is of a state-of-the-art design.

As mentioned above, the liquid tank (32) is positioned above the front wheel (8). Furthermore, the front wheel (8) is located in the center in relation to the chassis (4) so that the operator cannot see the orientation of the front wheel (8). This can cause problems, especially during the machine's approach to the work site. In order to overcome this disadvantage, the liquid tank (32) has a direction indicator (82) in the form of a needle (see also FIG. 3). This needle can be rotated and is connected to the front wheel (8) via a means of transmission (not embodied here), e.g., a shaft, in such a way that it displays the orientation of the front wheel (8). In order to keep the transmission path as short as possible, a further channel (84) is provided inside the liquid tank (32). This channel is constructed in one piece with the tank. This channel carries a means of transmission and extends from the front wheel (8) or its suspension up to the direction indicator (82) to transmit the orientation of the front wheel to the needle-shaped direction indicator (82).

In FIGS. 4 through 7, another liquid tank (32') according to one embodiment of the road milling machine according to the invention is shown. This tank corresponds to the liquid tank (32) described above, so that only the differences are described in what follows. Similar or identical parts are marked with the same reference numbers.

On the top of the liquid tank (32'), there are two lateral openings that are closed using a lid (86, 86). The tank can be filled with liquid through these openings (86, 86), and their lateral arrangement simplifies the filling from both the right and the left side of the road milling machine (2). In addition, the liquid tank (32') has a drain opening positioned at the lowest point of its floor; this opening is closed with another lid (88).

Furthermore, the liquid tank (32') is equipped with a transparent fill level indicator (90) in the form of a pipe or hose on one or on both sides to allow the fill level to be read. When assembled, the plate (64) is placed over the fill level indicator (90). Oblong notches (92) are provided so that the column of liquid can be read. The bars (94) between the successive notches (92) are used for calibration.

We claim:

1. A self-propelled road milling machine with a cooling system having at least one fan for drawing in air, at least one cooler, and at least one suction channel, the at least one suction channel has a vent opening facing the at least one cooler and an intake opening, wherein, in relation to a longitudinal axis of the road milling machine, the intake opening points to a side of the road milling machine so that air can be drawn in from the side, wherein the at least one suction channel has a first channel section directly following the intake opening, through said first channel section air flows essentially parallel to the longitudinal axis, a second channel section connected to the first channel section, and air in this second section flows essentially at right angles to the longitudinal axis, a third channel section connected to the second channel section, and through this third channel section air flows essentially parallel to the longitudinal axis toward the vent opening.

2. The road milling machine according to claim 1, wherein the first, second and third channel sections are positioned in such a way that the air in the first channel section flows essentially counter to a direction of travel of the road milling machine, and the air in the second channel section flows essentially at right angles to the direction of travel, and the air in the third channel section flows counter to the direction of travel.

3. The road milling machine according to claim 1, wherein the at least one suction channel is covered on the side by a removable plate.

4. The road milling machine according to claim 3, wherein the intake opening is constructed in the plate.

5. The road milling machine according to claim 3, wherein the plate is equipped with a sound-absorbing mat.

6. The road milling machine according to claim 1, wherein the first channel section is covered by a removable plate.

7. The road milling machine according to claim 1, wherein the at least one cooler comprises a cooling circuit for a drive unit coolant and a cooling circuit for a hydraulic fluid of a hydraulic system.

8. The road milling machine according to claim 1, wherein the road milling machine comprises a rear-loading road milling machine.

9. A self-propelled road milling machine with a cooling system having at least one fan for drawing in air, at least one cooler, and at least one suction channel, the at least one suction channel has a vent opening facing the at least one cooler and an intake opening, wherein, in relation to a longitudinal axis of the road milling machine, the intake opening points to a side of the road milling machine so that air can be drawn in from the side, wherein said at least one suction channel comprises a first suction channel and a second suction channel, wherein an intake opening of the first suction channel points to one side and an intake opening of the second suction channel points to an opposite side of the road milling machine.

10. A self-propelled road milling machine with a cooling system having at least one fan for drawing in air, at least one cooler, and at least one suction channel, the at least one suction channel has a vent opening facing the at least one cooler and an intake opening, wherein, in relation to a longitudinal axis of the road milling machine, the intake opening points to a side of the road milling machine so that air can be drawn in from the side, wherein the at least one suction channel is constructed inside a liquid tank.

11. The road milling machine according to claim 10, wherein the at least one suction channel is constructed in one piece with the liquid tank.

12. The road milling machine according to claim 10, wherein the liquid tank is made of plastic.

13. The road milling machine according to claim 10, wherein the at least one cooler and the at least one fan are attached to the liquid tank.

14. The road milling machine according to claim 10, wherein the liquid tank is positioned above a steerable wheel or a steerable wheel axis, a channel extends through the liquid tank, the channel carries a means of transmission that allows orientation of the wheel or the wheel axis to be transmitted to a direction indicator on a top side of the liquid tank.

15. The road milling machine according to claim 10, wherein the at least one suction channel is covered on the side by a removable plate.

16. The road milling machine according to claim 15, wherein the intake opening is constructed in the plate.

17. The road milling machine according to claim 15, wherein the plate is equipped with a sound-absorbing mat.

18. The road milling machine according to claim 10, wherein the road milling machine comprises a rear-loading road milling machine.

* * * * *